UNITED STATES PATENT OFFICE.

JOSEPH WOODWARD, OF SPRINGFIELD, MASSACHUSETTS.

IMPROVED PREPARED PASTE FOR BOOK-BINDERS, &c.

Specification forming part of Letters Patent No. 52,779, dated February 20, 1866.

*To all whom it may concern:*

Be it known that I, JOSEPH WOODWARD, of Springfield, Hampden county, Commonwealth of Massachusetts, have invented a new and Improved Prepared Paste; and I do hereby declare that the following is a full and exact description thereof.

My invention consists in the addition of ingredients to the common article of paste used by book-binders and others, and usually formed of wheat-flour and water, which shall have a chemical action on the flour or similar substance, so as to preserve it in condition for use for any length of time desired.

The advantages of this composition can be readily seen, as in this way we reduce to a standard article of commerce what has heretofore been a source of trouble and annoyance as well as large expense to every one using it. As paste as usually made soon sours and becomes unfit for use, and therefore requires to be frequently made, and as it is difficult to calculate the exact amount required in most shops, large quantities must be wasted by its souring; also, it is a well-known fact that any article of manufacture can be more economically and cheaply manufactured at one or more large establishments, where the materials can be bought in large quantities and at wholesale prices, than the same article can be manufactured by individuals, even if the ingredients are common and easily obtained.

It is the intention to so manufacture this article and sell it in packages of convenient size to consumers, and as it cannot sour or lose its adhesive qualities it may be kept on hand and used as desired.

The principal ingredient of this article being flour, which is an article of food, consequently any waste of it tends directly to increase the price of bread, and thus becomes of more importance than the mere loss of the cost of the flour.

This preparation consists of the following ingredients in substantially this proportion: Flour, two pounds; common salt, (chloride of sodium, NaCl,) one ounce; alum, one-fourth ounce; corrosive sublimate, (bichloride of mercury, $HgCl_2$,) six grains.

These are mixed together in the following manner: The salt and corrosive sublimate are precipitated together in warm water. The alum is then mixed with the flour, and this latter stirred up in the former mixture and formed into the desired consistency by the addition of flour or water, as it is desired to make it thicker or thinner.

As this article can be readily thinned by the addition of water it may be packed in a very thick state, so as to occupy as little room as possible. In this state it can be sold and thinned down for use as desired.

In the preparation of this article I have after much experiment settled on the formula above mentioned as most convenient for common manufacturing purposes, but do not wish to confine myself to the exact proportions or ingredients herein described, but claim the use of substantially the same or equivalent articles if they accomplish the same purpose in substantially the same manner.

The objection which would naturally arise from using a rank poison in this composition is met by the well-known fact in chemistry that the gluten of the flour acts as an antidote to the poisonous qualities of the corrosive sublimate, thus rendering the compound completely harmless.

Now, having described my invention, what I claim as new, and desire to secure by Letters Patent, is—

As a new article of manufacture, the substance herein described.

JOSEPH WOODWARD.

Witnesses:
J. B. GARDINER,
CHAUNCEY C. SHAW.